US006206665B1

United States Patent
Iizuka

(10) Patent No.: US 6,206,665 B1
(45) Date of Patent: Mar. 27, 2001

(54) ROTATION INHIBITING MECHANISM FOR MOVABLE SCROLL OF SCROLL TYPE FLUID MACHINE

(75) Inventor: Jiro Iizuka, Takasaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/245,219

(22) Filed: Feb. 5, 1999

(30) Foreign Application Priority Data

Feb. 5, 1998 (JP) .................................................. 10-024269

(51) Int. Cl.$^7$ ...................................................... F01C 1/02
(52) U.S. Cl. ........................ 418/55.3; 418/55.1; 464/103; 464/102; 384/609; 384/608; 384/615; 384/617
(58) Field of Search ................................. 418/55.3, 55.1; 464/103, 102; 384/609, 608, 615, 617

(56) References Cited

U.S. PATENT DOCUMENTS

| 3,738,504 | * | 4/1998 | Kitano ................................. 418/55.3 |
| 4,259,043 | * | 3/1981 | Hidden et al. ......................... 418/55 |
| 4,474,543 | | 10/1984 | Hiraga et al. . |
| 5,758,978 | * | 6/1998 | Satoda et al. ......................... 384/609 |
| 5,915,933 | * | 6/1998 | Iizuka et al. ......................... 418/55.3 |

FOREIGN PATENT DOCUMENTS

| 63-280882 | 11/1988 | (EP) . |
| 0809031 | 11/1997 | (EP) . |
| 62-010081 | 1/1987 | (JP) . |
| 63-179185 | 7/1988 | (JP) . |
| 5-033811 | 2/1993 | (JP) . |
| 5-087131 | 6/1993 | (JP) . |
| 8-228639 | 8/1996 | (JP) . |
| 9-310685 | 2/1997 | (JP) . |

* cited by examiner

Primary Examiner—Thomas Denion
Assistant Examiner—Thai-Ba Trieu
(74) Attorney, Agent, or Firm—Baker Botts L.L.P.

(57) ABSTRACT

A movable race 25 fixed to a movable scroll 20 which revolves with respect to a fixed scroll and a fixed race 24 opposing the movable race are respectively provided with pluralities of annular ball rolling grooves 24c and 25c extending along the revolutionary locus of the movable scroll and a plurality of balls 26 are held sandwiched between the plurality of ball rolling grooves 25c of the movable race and the plurality of ball rolling grooves 24c of the fixed race. Further, the radius of revolution S1 to be obtained by the movable race, the plurality of balls, and the fixed race is made smaller than the radius of revolution S2 to be determined by the scroll wall of the movable race and that of the fixed race. A relationship between a diameter Sa of a ball orbit of the movable race and a diameter Sb of a ball orbit of the fixed race is Sa<Sb or Sa>Sb, and the rotation inhibiting mechanism for the movable scroll comprising the movable race, the plurality of balls and the fixed race has a radius of revolution of (Sa+Sb)/2.

8 Claims, 10 Drawing Sheets

$\Delta Hd = (1-\cos(\theta-\phi)) \times (r-dw/2)$
$\Delta Hu = (1-\cos\phi) \times (r-dw/2)$
$\Delta H = \Delta Hu + \Delta Hd$

ROTATION INHIBITING MECHANISM FOR MOVABLE SCROLL OF SCROLL TYPE FLUID MACHINE

BACKGROUND OF THE INVENTION

The present invention relates to a scroll type fluid machine such as a compressor, a vacuum pump or an expander and more particularly, to a mechanism for inhibiting rotation of a movable scroll of the fluid machine revolving at the time of operation of the fluid machine.

A rotation inhibiting mechanism for the movable scroll of a prior art scroll type compressor described in Japanese Patent Unexamined Publication (JP-A) No. 310685/1997 will be described.

At the outset, a first technology of the prior art scroll type compressor will be described by referring to FIGS. 1 through 3. In FIG. 1, a housing 10 of the scroll type compressor is provided with a rear housing 10a in the shape of a large-diameter bottomed cylinder and a front housing 10b formed of a large-diameter cylindrical portion 10b1 and a small-diameter cylindrical portion 10b2 and fixed to an open end of the rear housing 10a. Further, the rear housing 10a and the front housing 10b are arranged concentric with each other.

Further, a shaft 11 extends into the housing 10 along the central axis X of the latter through the small-diameter cylindrical portion 10b2 of the front housing 10b. The shaft 11 is provided with a small-diameter portion 11a surrounded by the small-diameter cylindrical portion 10b2 of the front housing 10b and a large-diameter portion 11b surrounded by the large-diameter cylindrical portion 10b1. To one end surface of the large-diameter portion 11b there is fixed a driving pin 12 extending parallel to, and eccentric with, the axis X. The shaft 11 is rotatably supported by the large-diameter cylindrical portion 10b1 of the front housing 10b through a ball bearing 13 while the small-diameter portion 11a is rotatably supported by the small-diameter cylindrical portion 10b2 of the front housing 10b through a ball bearing 14.

At a position radially and outwardly of the small-diameter cylindrical portion 10b2 of the front housing 10b there is arranged an electromagnetic clutch 15. The electromagnetic clutch 15 rotatably fits about the small-diameter cylindrical portion 10b2 of the front housing 10b and is provided with a pulley 15a connected to an external driving source (not shown) by means of a V-belt (not shown), an exciting coil 15b fixed to the small-diameter cylindrical portion 10b2 and a rotation transmitting plate 15c fixed to one end of the small-diameter portion 11a of the shaft 11. Thus, the shaft 11 is rotated by the external driving source (not shown) through the electromagnetic clutch 15.

Within the rear housing 10a there is arranged a fixed scroll 16.

The fixed scroll 16 is provided with a disk-shaped end plate 16a which fits in the rear housing 10a arranged coaxially with the axis X, a spiral body 16b formed on one of the surfaces of the end plate 16a and legs 16c formed on the other surface of the end plate 16a. At the center of the end plate 16a there is formed a discharge hole 16a1. The fixed scroll 16 is fixed to the rear housing 10a by means of bolts 17 while the legs 16c are held in contact with the bottom 10a1 of the rear housing 10a. The space within the rear housing 10a is divided into an intake chamber 18 and a discharge chamber 19 by means of the end plate 16a of the fixed scroll 16.

Within the rear housing 10a there is disposed a movable scroll 20 as a revolving member lying adjacent to the fixed scroll 16. The movable scroll 20 is provided with a disk-shaped end plate 20a, a spiral body 20b formed on one of the surfaces of the end plate 20a and an annular boss 20c formed on the other surface of the end plate 20a. The central axis of the end plate 20a is eccentric with the axis X. The spiral body 20b of the movable scroll 20 engages with the spiral body 16b of the fixed scroll 16.

Within the boss 20c there is rotatably fitted, through a needle bearing 22, a thick disk-shaped bush 21 disposed concentric with the end plate 20a. Further, the bush 21 is provided with an eccentric through hole 21a extending parallel to the axis X and a balance weight 23 extending in the radial direction is fixed to the bush 21. The through hole 21a houses the driving pin 12 fixed to the large-diameter portion 11b of the shaft 11 so as to allow the pin 12 to slide therein.

A fixed race 24 is fixed to one end of the large-diameter cylindrical portion 10b1 of the front housing 10b and a movable race 25 is fixed to the end plate 20a of the movable scroll 20. Further, a plurality of balls 26 are interposed between the fixed race 24 and the movable race 25 in spaced apart relationships with one another in the circumferential direction and a ball coupling for preventing the rotation of the movable scroll 20, that is, a rotation inhibiting mechanism is constructed by these races 24 and 25 and the plurality of balls 26.

The above-described ball coupling will be described with reference to FIGS. 2A and 2B. Each of the fixed race 24 and the movable race 25 is formed by a press using a ferrous material and is in the shape of an annular ring. The fixed race 24 is provided on one of the surfaces thereof with a plurality of annularly extending ball rolling grooves 24c which are spaced apart from one another in the circumferential direction and likewise, the movable race 25 is provided on one of the surfaces thereof with a plurality of annularly extending ball rolling grooves 25c which are spaced apart from one another in the circumferential direction. The balls 26 are made of a bearing steel material and are interposed between the fixed race 24 and the movable race 25 in a state in which they are held sandwiched by the rolling grooves 24c of the fixed race 24 and the opposing ball rolling grooves 25c of the movable race 25.

To continue to describe further the present invention by referring to FIG. 3, the inner surface of the ball rolling groove 24c includes an inner peripheral portion 24c1 having a curved surface of a radius of curvature R1, an outer peripheral portion 24c2 having a curved surface of a radius of curvature of R2 and a bottom portion 24c3 connecting the portions 24c1 and 24c2 while the inner surface of the ball rolling groove 25c includes an inner peripheral portion 25c1 having a curved surface of a radius of curvature of R1, an outer peripheral portion 25c2 having a curved surface of a radius of curvature of R2 and a bottom portion 25c3 connecting the portions 25c1 and 25c2. The radius of curvature R1 and the radius of curvature R2 may be the same or somewhat different from each other. Anyway, the radii of curvature R1 and R2 bear close resemblance to the radius of each of the balls 26 and are set to a value slightly larger than the value of the radius of each of the balls 26.

The bottom portions 24c3 and 25c3 are each in the form of a flat surface so as to become tangential to the inner peripheral portions 24c1 and 25c1 and the outer peripheral portions 24c2 and 25c2, respectively. In other words, the bottom portions 24c3 and 25c3 form themselves geometrical curved surfaces of large radii of curvature gently connecting the inner peripheral portions 24c1 and 25c1 to the outer peripheral portions 24c2 and 25c2, respectively. The central diameter of each of the curved bottom portions 24c3 and 25c3 is set to a value substantially identical with the radius of revolutionary motion of the movable scroll 20. Further, the size of the width of each of the bottom portions 24c3 and 25c3 is set to one-third of the width of the effective ball rolling locus and it is desirable to set this size to a value which is determined in anticipation of an error of the shape of each of the scrolls of the scroll type compressor, an error of the attachment position of each of the races and an error of the position of each of the ball rolling grooves.

On the other hand, on the other surfaces of the fixed race 24 and the movable race 25, there are provided flat portions 24d and 25d, respectively. These flat portions 24d and 25d are larger in width than the bottom portions 24c3 and 25c3. Accordingly, the fixed race 24 and the movable race 25 are brought into contact with, and supported by, the large-diameter cylindrical portion 10b1 of the front housing 10b and the end plate 20a of the movable scroll 20 as race support members, over a width larger than the width of each of the bottom portions 24c3 and 25c3.

Returning to FIG. 1, the operation of the scroll type compressor provided with the above-described ball coupling will be described. The shaft 11 of the compressor is rotated by the external drive source (not shown) through the electromagnetic clutch 15. When the shaft 11 is rotated, the bush 21 revolves about the axis X and the movable scroll 20 revolves about the axis X. Thus, by the revolution of the movable scroll 20, the space formed between the spiral body 20b of the movable scroll 20 and the spiral body 16b of the fixed scroll 16, that is, a compression chamber shifts toward the center of the spiral body 16b as it reduces its capacity. As a result, a fluid flowed into the intake chamber 18 from an external fluid circuit through the intake port (not shown) formed in the housing 10 is taken into the compression chamber from the outer peripheral ends of both of the spiral bodies 16b and 20b, compressed within the compression chamber and flows out into the discharge port 19 through the discharge hole 16a1 formed in the fixed scroll 16. The pressurized fluid flowed into the discharge chamber 19 then flows outside the external fluid circuit through the discharge port (not shown) formed in the rear housing 10a.

The reaction force applied on the movable scroll 20 in the direction of the axis X and the movable scroll rotation inhibiting force in the radial direction at the time when the fluid is compressed are transmitted to the front housing 10b through the movable race 25, each of the balls 26, and the fixed race 24.

With the revolution of the movable scroll 20, each of the balls 26 rolls within the ball rolling grooves 24c and 25c as it draws a circular orbit having a diameter substantially the same as the radius of revolution of the movable scroll 20. In this case, since the diameter of the bottom portion 24c3 (25c3) of the ball rolling groove 24c (25c) is set to a value substantially the same as the value of the radius of revolution of the movable scroll 20, each of the balls 26 can roll smoothly within the ball rolling grooves 24c and 25c as it draws a circular orbit of a diameter substantially equal to the radius of revolution of the movable scroll 20 in a state in which it is pressed against the bottom portions 24c3 and 25c3 of the ball rolling grooves 24c and 25c, respectively. As a result, the movable scroll 20 revolves while it keeps a predetermined angular relationship with the front housing 10b, and in the end, with the fixed scroll 16.

When the movable scroll 20 revolves, the movable scroll 20 tends to rotate about the bush 21. However, since the rolling range of each of the balls 26 is limited to the interior of ball rolling grooves 24c and 25c, the rotation of the movable scroll 20 is inhibited.

In the above case, each of the balls 26 rolls generally along the bottom portions 24c3 and 25c3 of the rolling grooves 24c and 25c, respectively. Namely, even if the radius of each of the rolling grooves 24c and 25c differs from the actual radius of revolution of the movable race 25 by dimensional tolerance and mounting discrepancy of each of parts in practical manufacturing of the scroll type compressor, it is not feared that each of the balls 26 rolls on a curved surface apart from the bottom portions 24c3 and 25c3 of the ball rolling grooves 24c and 25c, that is, in a state ridden on the inner peripheral portions 24c1 and 25c1 and the outer peripheral portions 24c2 and 25c2. Further, the lines of action of thrust forces F0 acting on the fixed and movable races 24 and 25, respectively, from the ball 26 generally coincide with each other along the axial direction.

Further, generation of the resistant force is generally needed against the compressive reaction force in the scroll type compressor. In order to generate the resistant force, it is considered that each of the balls 26 rolls receives the force which makes it tend to ride on the curved surface from the bottom portions 24c3 and 25c3 of the rolling grooves 24c and 25c. At this time, if the back surfaces of the fixed and movable races 24 and 25 are the curved surfaces, respectively, the fixed and movable races 24 and 25 repeat inroad, tough and alienation to the maintaining members (the large-diameter cylindrical portion 10b1 and the end plate 20a) thereof. As a result, fretting abrasion occurs. On the contrary, when the flat portions 24d and 25d are provided on the back surfaces of the fixed and movable races 24 and 25, respectively, contacting pressure between the fixed and movable races 24 and 25 and the maintaining members reduces, and the fixed and movable races 24 and 25 can not float to each of the balls 26. Consequently, the fixed and movable races 24 and 25 and the maintaining members are prevented from the fretting abrasion.

A ball coupling as a rotation inhibiting mechanism according to a second prior art technology will be described with reference to FIG. 4 wherein like parts are designated by like reference numerals with respect to the ball coupling shown in FIGS. 2A and 2B and FIG. 3 without repeating the description thereof.

In the case of the ball coupling shown in FIG. 4, the radius of curvature R3 of the bottom portion 24c3 (25c3) of the ball rolling groove 24c (25c) of the fixed race 24 (the movable race 25) is set to a value far larger than any of the radius of curvature R1 of the inner peripheral portion 24c1 (25c1) of the fixed race 24 (the movable race 25) and the radius of curvature R2 of the outer peripheral portion 24c2 (25c2) of the fixed race 24 (the movable race 25). However, it goes without saying that the bottom portion 24c3 (25c3) is so formed as to become tangential to the inner peripheral portion 24c1 (25c1) and the outer peripheral portion 24c2 (25c2). Thus, according to this structure, the inner surfaces of the ball rolling grooves 24c and 25c are continuously curved so that it is possible to prevent the surface pressure from rising up locally. It is noted that the radius of curvature R1 and the radius of curvature R2 may be identical with, or somewhat different from, each other.

The bottom portion 24c3 (25c3) of the ball rolling groove 24c (25c) is not always required to be flat. That is, where the inner peripheral portion 24c1 (25c1) and the outer peripheral portion 24c2 (25c2) are made to form curved surfaces whose radii of curvature are R1 and R2, respectively, the bottom portion 24c3 (25c3) may be made to form a geometrical curved surface whose radius of curvature is larger than any of the radii of curvature of R1 and R2.

A prior art ball coupling as a rotation inhibiting mechanism according to a third prior art technology will be described with reference to FIG. 5 wherein parts similar to those of the ball coupling shown in FIGS. 3 and 4 are designated by the same reference numerals without repeating the description thereof.

In the case of the ball coupling shown in FIG. 5, the inner surface of each of the ball rolling grooves 24c (25c) of the fixed race 24 (the movable race 25) is curved in the form of an annular ellipse having its major axis in the radial direction. In other words, the inner surface of each of the ball rolling grooves 24c (25c) of the fixed race 24 (movable race 25) is formed by one half portion, or a part, of an ellipse having two foci obtained by dividing the ellipse by its major axis. Thus, in this way also, the inner surface of the ball rolling groove 24c (25c) becomes continuously curved so that it is possible to prevent the surface pressure from rising locally.

The formation of the above-described inner curved surface of each of the ball rolling grooves 24c (25c) will be described more specifically with FIG. 6. Assuming that the diameter of each of the balls 26 is expressed by d, the distance H from the bottom of the ball rolling groove 25c up to the foci f1 and f2 of an ellipse, the following equation will be satisfied.

$$H=(d/2)+r$$

wherein $r \geqq 0$.

Further, assuming that the distances from one of the surfaces of the movable race 25 to the two foci f1 and f2 are A1 and B1, the distances from the bottom of the ball rolling grooves 25c to the two foci f1 and f2 are A2 and B2, and the space between the foci f1 and f2 is C1, the following equation will be established:

$$A1+B1+C1=A2+B2+C1$$

Accordingly, it is possible to obtain the positions of f1 and f2 of the ellipse when the inner surface of each of the ball rolling grooves 25c of the movable race 25 can be formed.

It should be noted that although the movable race 25 is shown in FIG. 6, the same process can be taken when the inner surface of each of the ball rolling grooves 24c of the fixed race 24 is formed.

In the case of the rotation inhibiting mechanism of the movable scroll of the prior art scroll type compressor, there exists the relationship of Sa=Sb between the diameter Sa of the ball orbit of the movable race 25 and the diameter Sb of the ball orbit of the fixed race 24. The central axis when the ball 26 rolls is always perpendicular to the central axis X of the housing 10 of the scroll type compressor. Therefore, the contact between the ball 26 and the fixed and movable races 24, 25 is performed at a pair of spots symmetrical to the center of the ball 26. Consequently, the spots only of the ball 26 perform rolling contact to the movable race 25 and the fixed race 24, so that the durability of the ball 26 decreases.

In the case of Sa≠Sb, the difference between the radius of revolution (the radius of turning of the movable scroll) to be determined by the scroll walls of the movable scroll and fixed scroll and the radius of revolution to be obtained by the rotation inhibiting mechanism of the movable scroll (the movable race, the plurality of the balls and the fixed race) deteriorates the contact relationship between the scroll walls. When the contact relationship between the scroll walls is too much strong, efficiency of the compressor decreases and each of the plurality of the balls rides on the ball rolling grooves of the movable and fixed races. Therefore, the rotation inhibiting mechanism of the movable scroll abrades and deforms so that the durability of the mechanism decreases. On the contrary, when the contact relationship between the scroll walls is too much weak, sealing of each of the compression chambers which are divided by the scroll walls becomes insufficient. Consequently, the compressive efficiency of the compressor decreases.

SUMMARY OF THE INVENTION

Accordingly, an object of the present invention is to provide a durable rotation inhibiting mechanism for a movable scroll of a scroll type fluid machine which does not need major alteration of the rotation inhibiting mechanism thereof.

In accordance with the present invention, there is provided a rotation inhibiting mechanism for a movable scroll of a scroll type fluid machine comprising a fixed scroll having a fixed race provided with a plurality of annular ball rolling grooves extending along a revolutionary locus of the movable scroll, the movable scroll revolving with respect to the fixed scroll and having a movable race fixed to the movable scroll and provided with a plurality of annular ball rolling grooves extending along the revolutionary locus of the movable scroll, the fixed race opposing to the movable race and provided with a plurality of balls sandwiched between the ball rolling grooves of the movable race and those of the fixed race, wherein when a diameter of a ball orbit of the movable race is Sa and a diameter of a ball orbit of the fixed race is Sb, a relationship of either Sa<Sb or Sa>Sb is established, and the rotation inhibiting mechanism for the movable scroll comprising the movable race, the plurality of balls and the fixed race has a radius of revolution of (Sa+Sb)/2.

DESCRIPTION OF THE PREFERRED EMBODIMENT

A scroll type compressor provided with a ball coupling as a rotation inhibiting mechanism for a movable scroll of the compressor according to one embodiment of the present invention will be described.

The basic structure of the scroll type compressor according to one embodiment of the invention is the same as that of the prior art scroll type compressor. Therefore, the essential point of this embodiment will be described by referring to FIGS. 7 through 10. The rotation inhibiting mechanism for the movable scroll does not allow the movable scroll to rotate although it allows the movable scroll to revolve.

Figure 7:
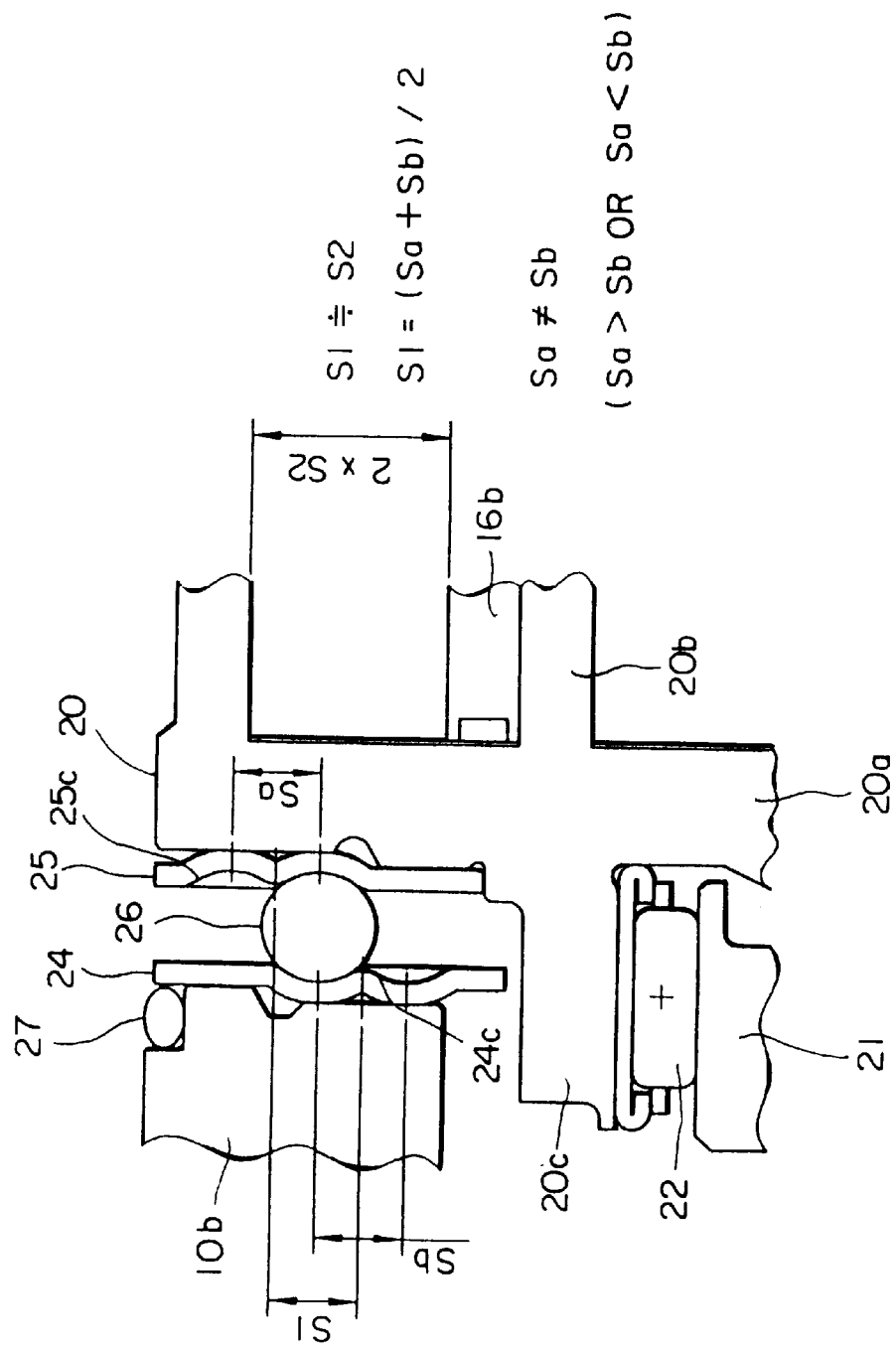
FIG. 7 is a sectional view of an essential portion of a rotation inhibiting mechanism for a movable scroll of a scroll type compressor according to one embodiment of the present invention.

The rotation inhibiting mechanism for the movable scroll comprises a movable race 25, a plurality of balls 26 and a fixed race 24 and it is arranged between the movable scroll 20 and a front housing 10b. In FIG. 7, a spiral body 20b of the movable scroll 20 engages with a spiral body 16b of a fixed scroll. An end plate 20a of the movable scroll 20 and a thick disk-shaped bush 21 are arranged concentric with each other and the bush 21 rotatably fits into a boss 20c of the movable scroll 20 through a needle bearing 22.

To the end plate 20a of the movable scroll 20 on the side of the front housing 10b there is fixed the movable race 25. To the front housing 10b on the side of the movable scroll 20 there is fixed the fixed race 24. The movable race 25 and the fixed race 24 have pluralities of annular ball rolling grooves 25c and 24c extending along a revolutionary locus of the movable scroll 20, respectively. Further, between the ball rolling grooves 25c of the movable race 25 and the ball rolling grooves 24c of the fixed race 24 there are interposed the balls 26, respectively. An O-ring 27 is disposed between the front housing 10b and a rear housing.

Figure 1:
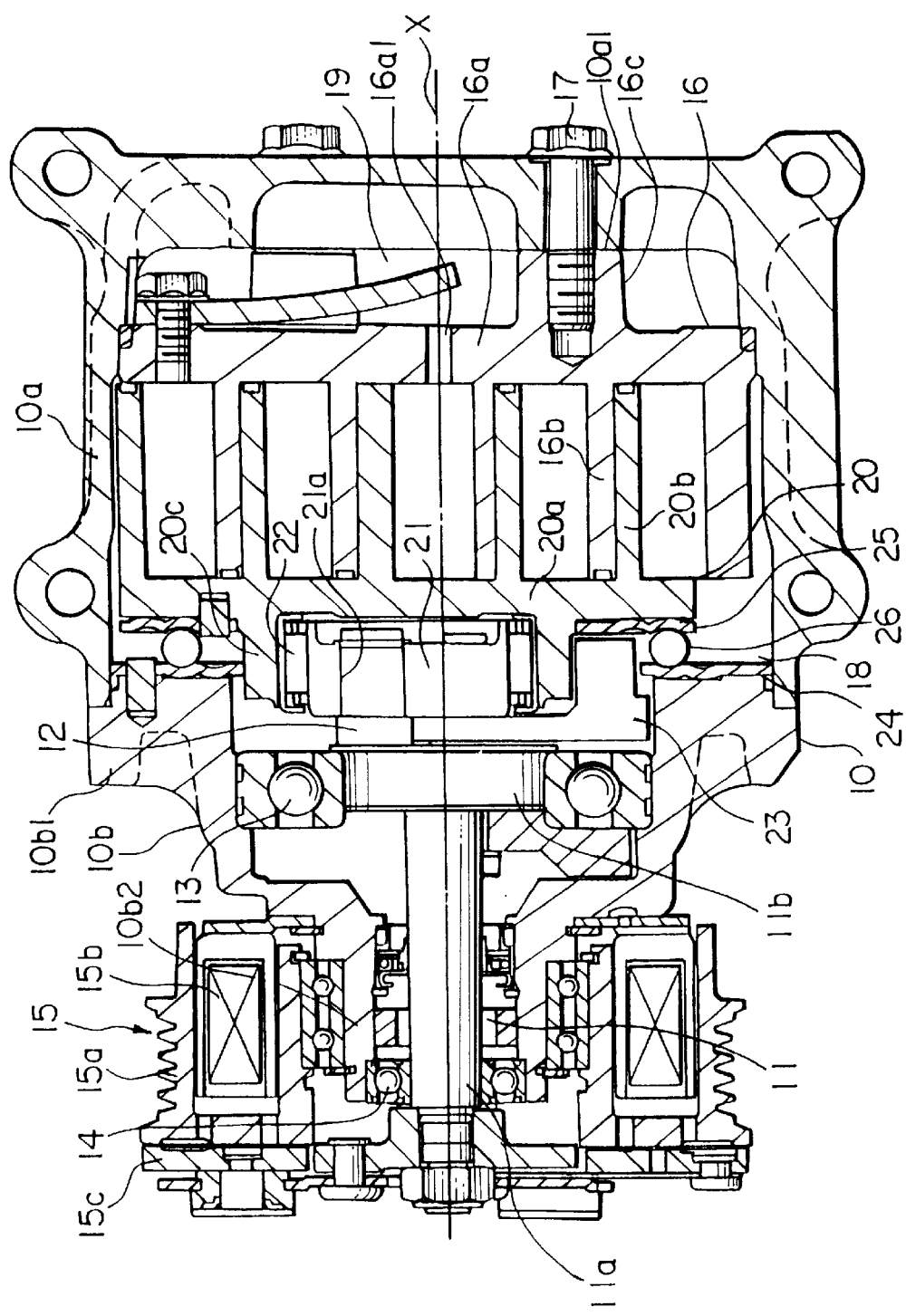
FIG. 1 is a vertical sectional view of a prior art scroll type compressor which is provided with a rotation inhibiting mechanism for a movable scroll according to a first prior art technology.
Figures 2A, 2B:
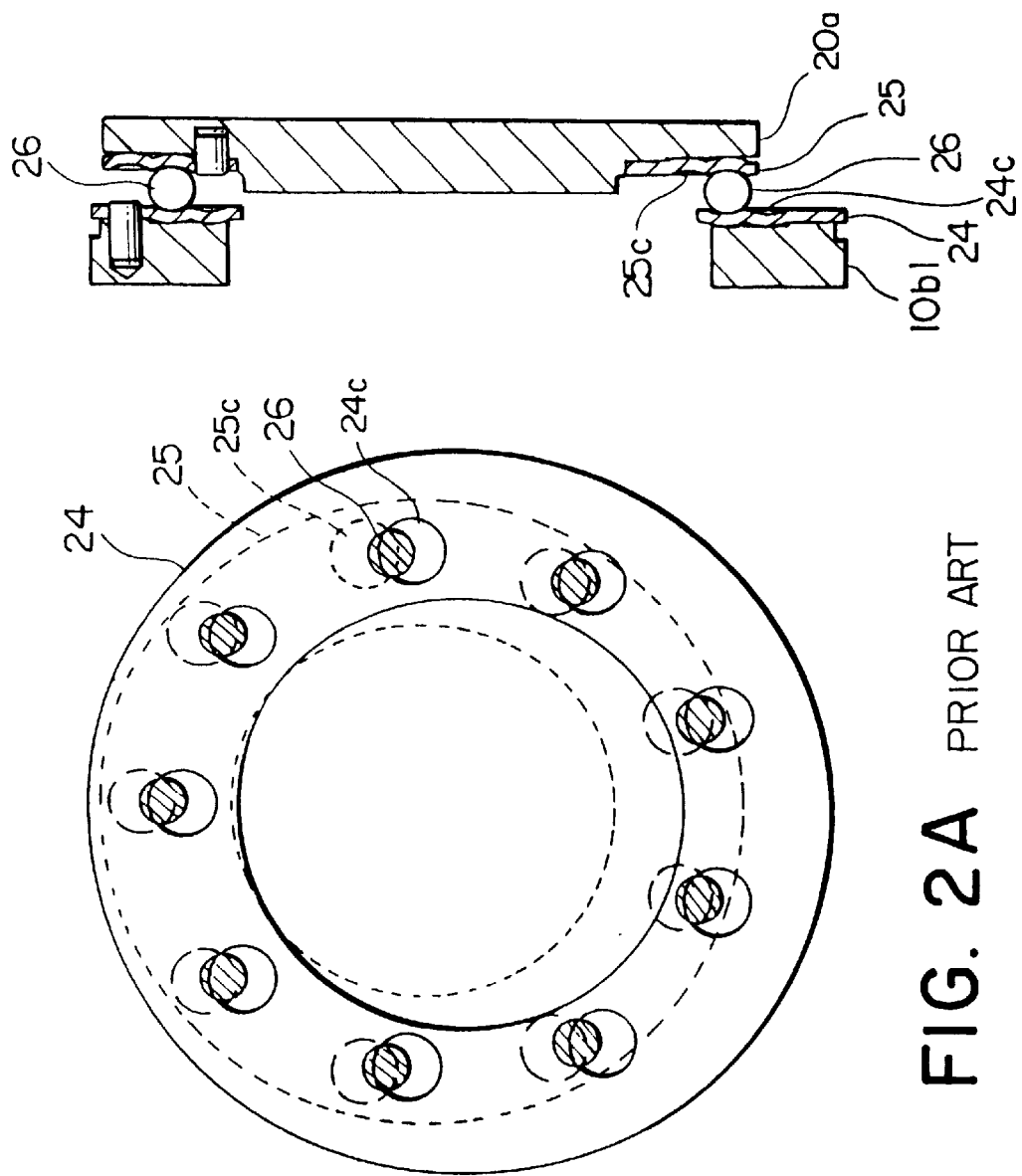
FIG. 2A is a front view of the rotation inhibiting mechanism for the movable scroll according to the first prior art technology.
FIG. 2B is a cross-sectional view of the rotation inhibiting mechanism for the movable scroll according to the first prior art technology.
Figure 3:
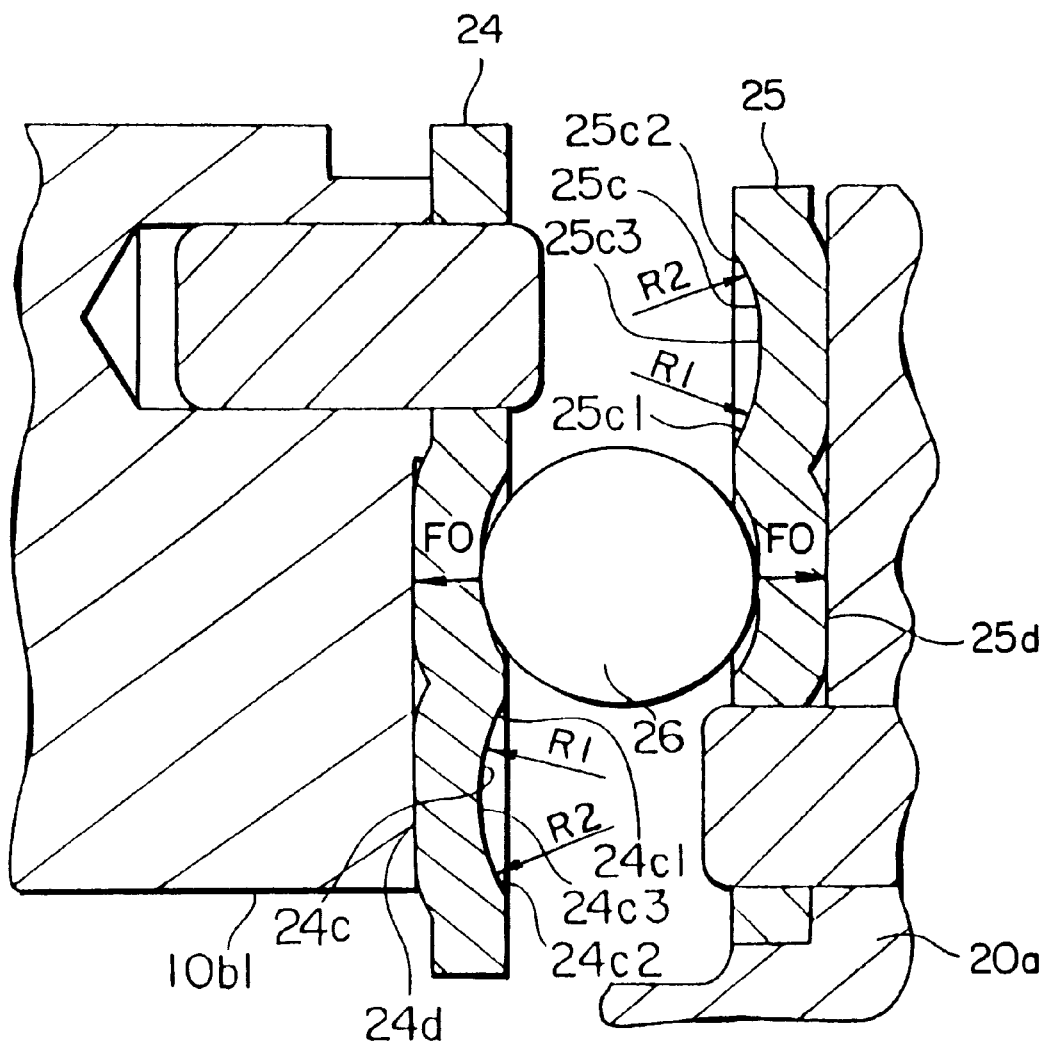
FIG. 3 is an enlarged sectional view of an essential portion of the rotation inhibiting mechanism for the movable scroll according to the first prior art technology.
Figure 4:
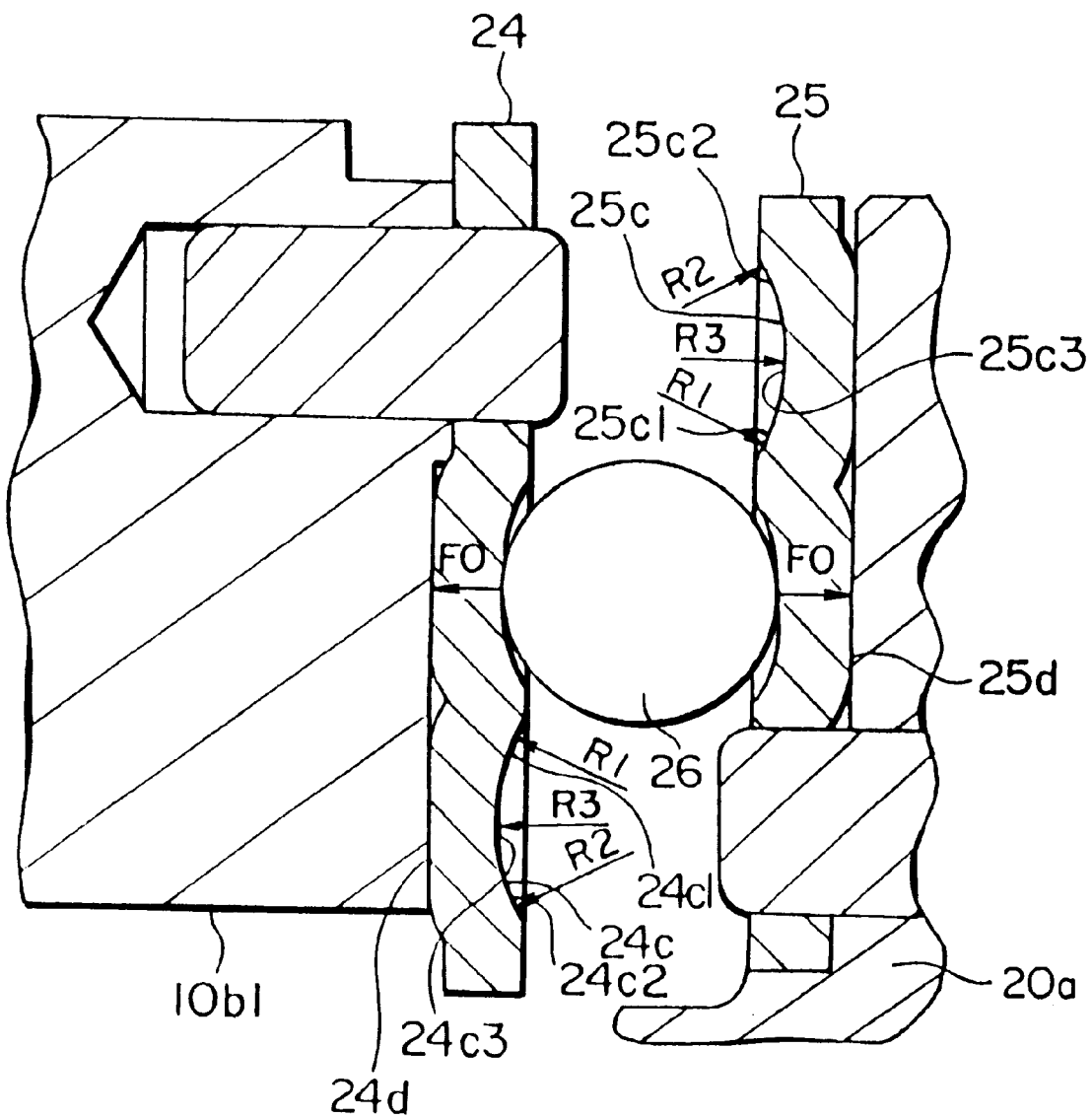
FIG. 4 is an enlarged sectional view of an essential portion of a rotation inhibiting mechanism for a movable scroll of a scroll type compressor according to a second prior art technology.
Figure 5:
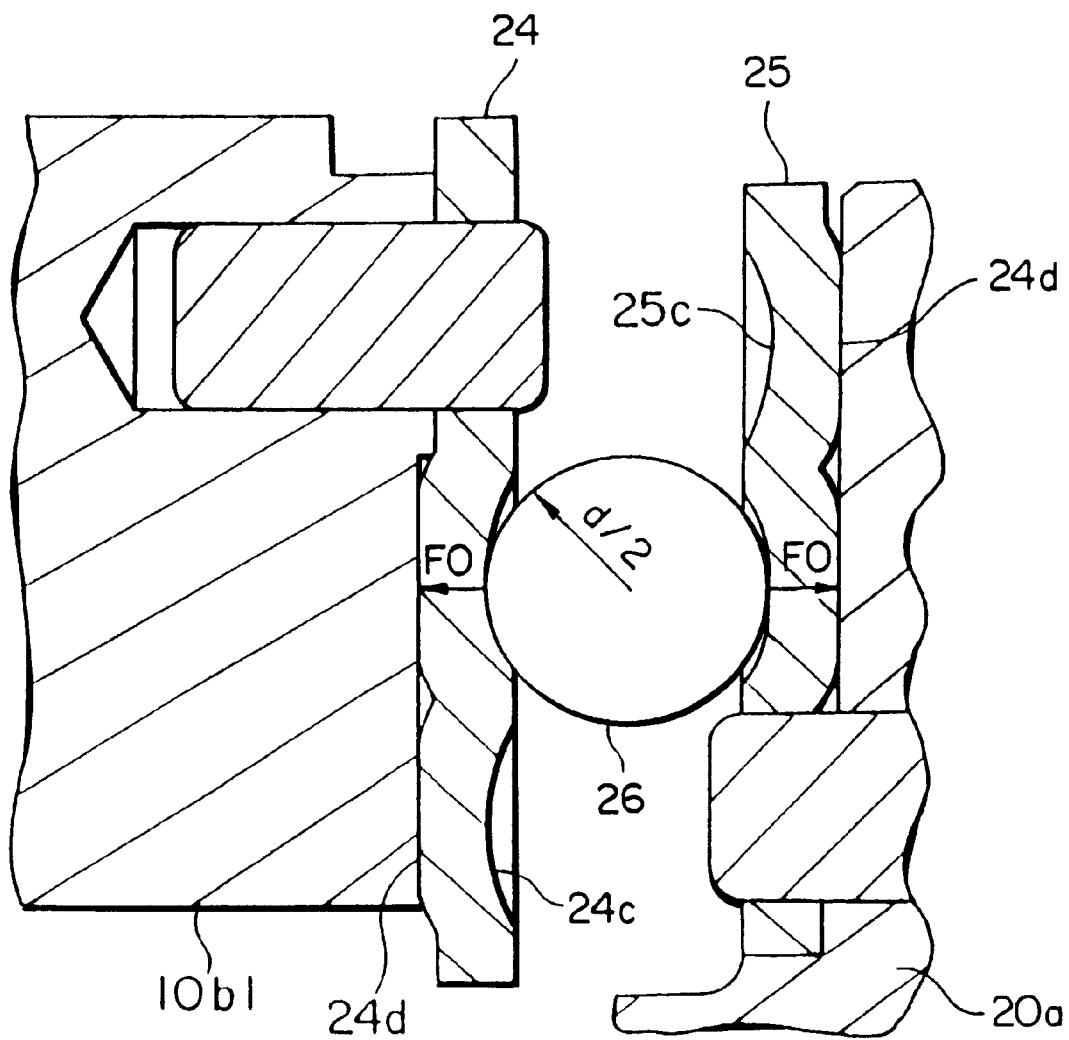
FIG. 5 is an enlarged sectional view of an essential portion of a rotation inhibiting mechanism for a movable scroll of a scroll type compressor according to a third prior art technology.
Figure 6:
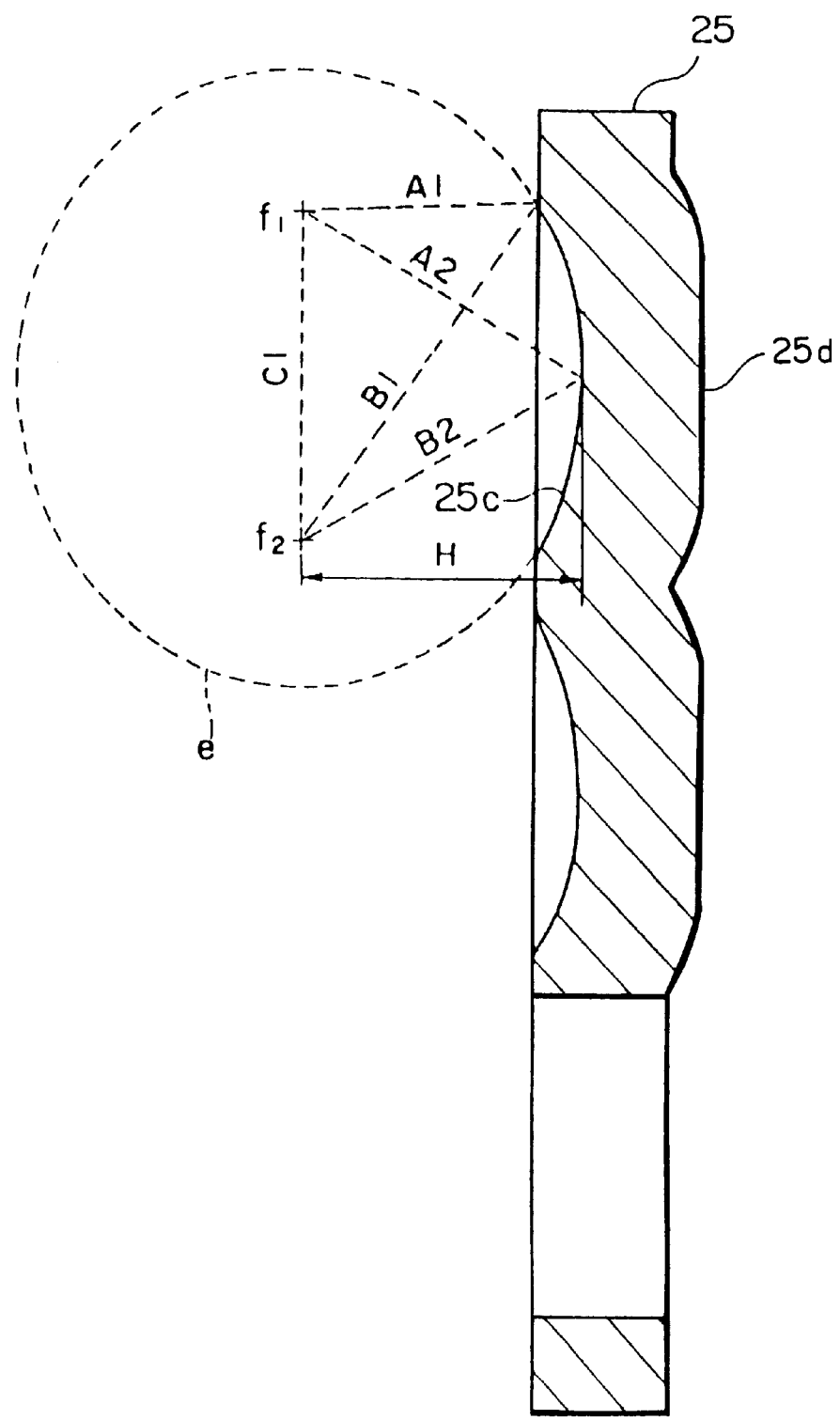
FIG. 6 is an illustrative view of the essential portion of the rotation inhibiting mechanism for the movable scroll according to the third prior art technology.
Figure 8:
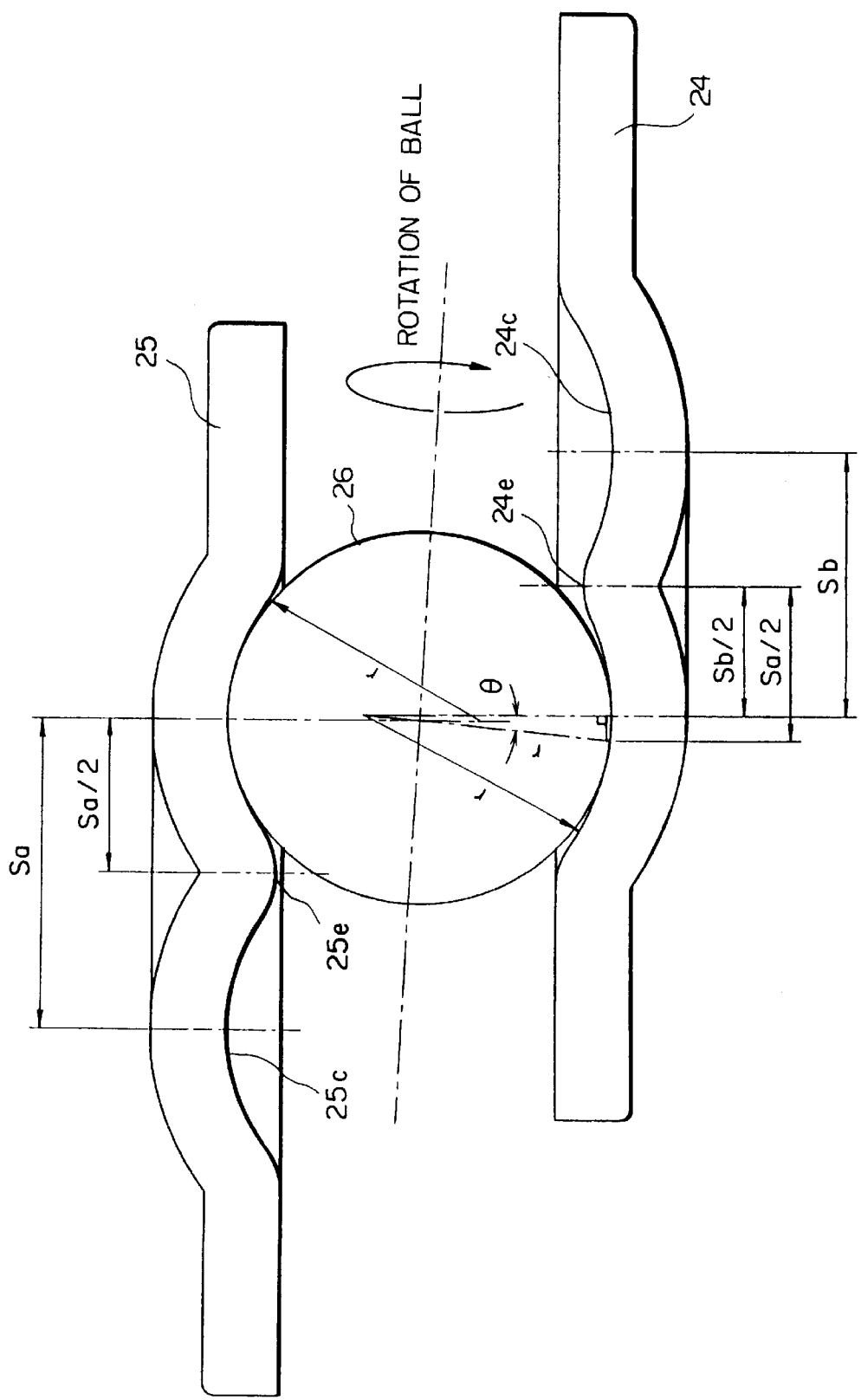
FIG. 8 is a sectional view of a state when a ball has ridden on an outer edge of a ball rolling groove of a fixed race of the rotation inhibiting mechanism for the movable scroll of the scroll type compressor according to the embodiment of the present invention.

In FIG. 8, on the circumference of a predetermined radius of the ring-shaped movable race 25 there are provided the plurality of annular ball rolling grooves 25c at equal intervals (confer to FIG. 2A). At the center of each of the ball rolling grooves 25c there is formed a projection 25e about which the ball 26 rolls. Similarly, in FIG. 8, on the circumference of a predetermined radius of the ring-shaped fixed race 24 there are provided the plurality of annular ball rolling grooves 24c at equal intervals. At the center of each of the ball rolling grooves 24c there is formed a projection 24e about which the ball 26 rolls.

Assuming that the diameter of the ball orbit of the movable race 25 is Sa, the diameter of the ball orbit of the fixed race 24 is Sb, namely, the traveling locus of the contact point of each ball 26 on the ball rolling grooves 25c and 24c of the movable race 25 and fixed race 24 is respectively a circle having the diameter Sa and Sb when each ball 26 rolls on the ball rolling grooves 25c and 24c, the radius of revolution (the radius of turning) of the rotation inhibiting mechanism of the movable scroll 20 is S1, and the radius of revolution (the radius of turning) of the movable scroll 20 is S2, the following relationships will be established in the present invention:

$Sa > Sb$ or $Sa < Sb$ $S1 = (Sa + Sb)/2$ $S1 \approx S2$

Action of the ball 26 will be explained minutely in the case of Sa>Sb.

In a case of the situation as the rotation inhibiting mechanism of the movable scroll 20 is incorporated, when the ball 26 contacts with both the bottom of the ball rolling groove 25c of the movable race 25 and the bottom of the ball rolling groove 24c of the fixed race 24, the above-mentioned rotation inhibiting mechanism is in the most stable state (called the condition 1 hereafter). In a case of the compressor is operating, the following two matters are the stable conditions of the above-mentioned rotation inhibiting mechanism. One of the stable conditions is that the rolling distance (the circumferential length) of the ball 26 at the movable race 25 is equal to the rolling distance of the ball 26 at the fixed race 24 (called the condition 2 hereafter). The other of the stable conditions is that the height of the central axis in the X direction of the entire rotation inhibiting mechanism of the movable scroll 20 is in the lowest state (called the condition 3 hereafter).

Conventionally, in the rotation inhibiting mechanism of the movable scroll of which the diameter of the ball orbit of the movable race is equal to the diameter of the ball orbit of the fixed race, the conditions 1, 2 and 3 are realized simultaneously, so that the ball always rotates about the same rotating axis. Therefore, the ball performs rolling contact at the same portion of the spherical surface thereof to the ball rolling groove of the movable race and the fixed race. Consequently, metallic fatigue concentrates at a partial latitude range of the spherical surface of the ball, so that the spherical surface of the ball peels locally.

In the construction of the present invention, the diameter Sa of the ball orbit of the movable race 25 is not equal to the diameter Sb of the ball orbit of the fixed race 24, and the rolling axis of the ball 26 inclines slightly to the perpendicular direction to the central axis X direction.

Accordingly, the conditions 1, 2 and 3 are not realized, so that the contact points of the ball 26 to the ball rolling groove 25c of the movable race 25 and the ball rolling groove 24c of the fixed race 24 shift gradually, the above-mentioned contact points distribute at some range. Consequently, the portions of the spherical surface of the ball 26 where contact stresses occur to the ball rolling groove 25c of the movable race 25 and the ball rolling groove 24c of the fixed race 24 are distributed so that the durability of the ball 26 improves.

Figure 9:
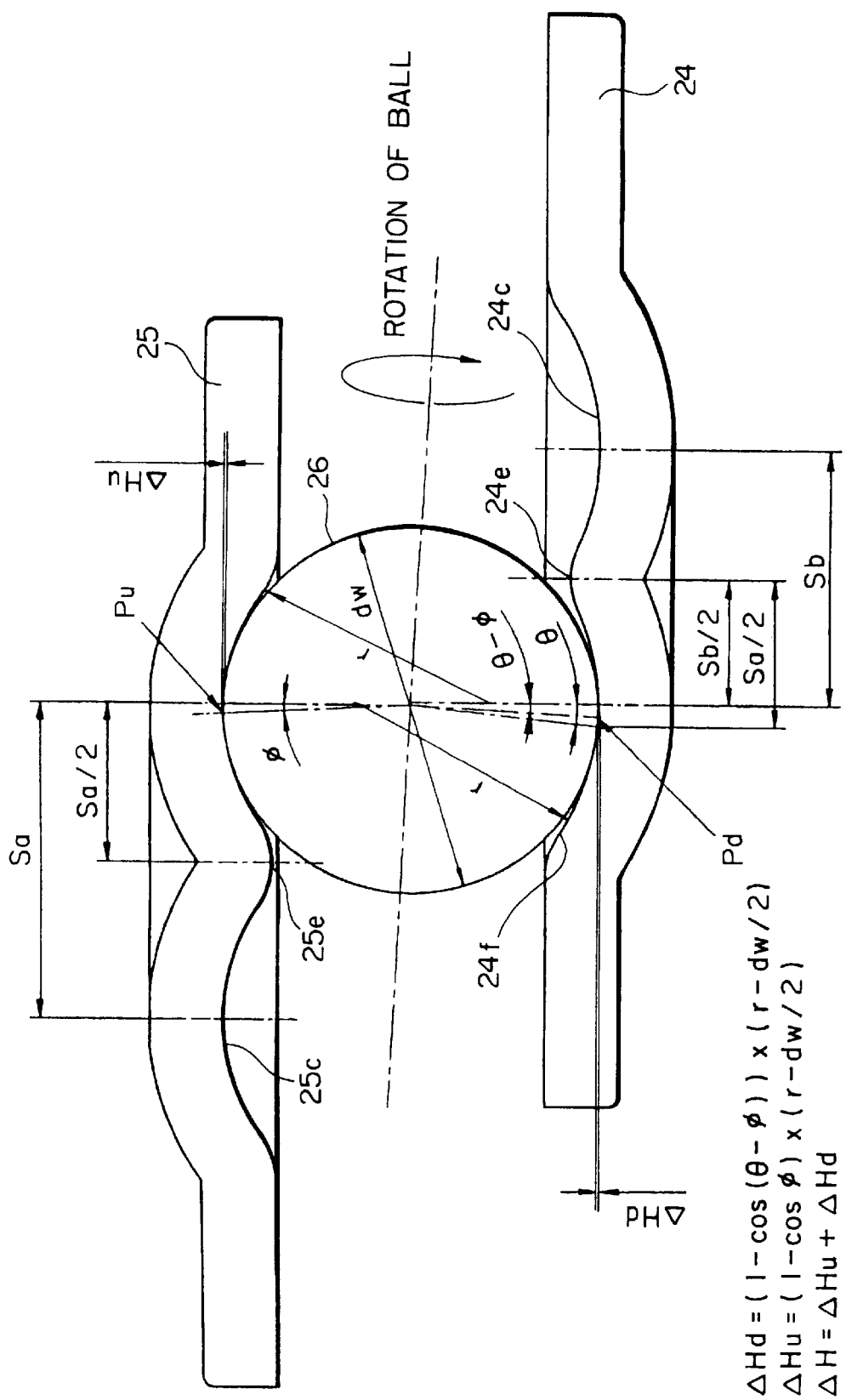
FIG. 9 is a sectional view of a state when the ball has ridden on both the outer edge of the ball rolling groove of the fixed race and a projection of a ball rolling groove of a movable race of the rotation inhibiting mechanism for the movable scroll of the scroll type compressor according to the embodiment of the present invention.

In the case of the situation as the rotation inhibiting mechanism of the movable scroll 20 according to the present invention is incorporated, when the ball 26 contacts with both the ball rolling groove 25c of the movable race 25 and the ball rolling groove 24c of the fixed race 24, the above-mentioned rotation inhibiting mechanism is in the most stable state also (the state of the condition 1). However, in the case of the compressor is operating, it requires that the distance from the contact point Pu to a projection 25e is equal to the distance from the contact point Pd to a projection 24f in order to equalize (becoming to the state of the condition 2) the rolling distance of the ball 26 at the movable race 25 (circumferential length) to the rolling distance of the ball 26 at the fixed race 24. Incidentally, Pu is the contact point between the ball 26 and the movable race 25. Pd is the contact point between the ball 26 and the fixed race 24. Therefore, the ball 26 rides on to an outer edge 24f of the ball rolling groove 24c of the fixed race 24 at a swing angle θ of ball riding. Assuming that the curvature radius of the ball rolling groove 24c is r, the following equation will be established as shown in FIG. 9:

$$\sin \theta = (Sa - Sb)/(2 \times r)$$

Further the state (the state of the condition 3) which the amount ΔH of height change of the central axis in the X direction of the entire rotation inhibiting mechanism of the movable scroll 20 is the lowest is actually one of the extent of θ−φ=φ, because the plurality of the balls 26 are interposed between the ball rolling grooves 25c of the movable race 25 and the ball rolling grooves 24c of the fixed race 24. Incidentally, φ is a swing angle of ball riding to which the ball 26 rides on to a projection 25e side of the ball rolling groove 25c of the movable race 25.

Also, the curvature radius of the ball rolling groove 25c is r. However, the curvature radius r of the ball rolling groove 25c is allowed to differ from that of the ball rolling groove 24c.

Assuming that the diameter of the ball is dw, amounts of ball height change of the fixed race side is ΔHd, and amounts of ball height change of the movable race side is ΔHu, the following equation will be established:

$$\Delta Hd = (1 - \cos(\theta - \phi)) \times (r - dw/2)$$

$$\Delta Hu = (1 - \cos \phi) \times (r - dw/2)$$

$$\Delta H = \Delta Hd + \Delta Hu$$

Figure 10:
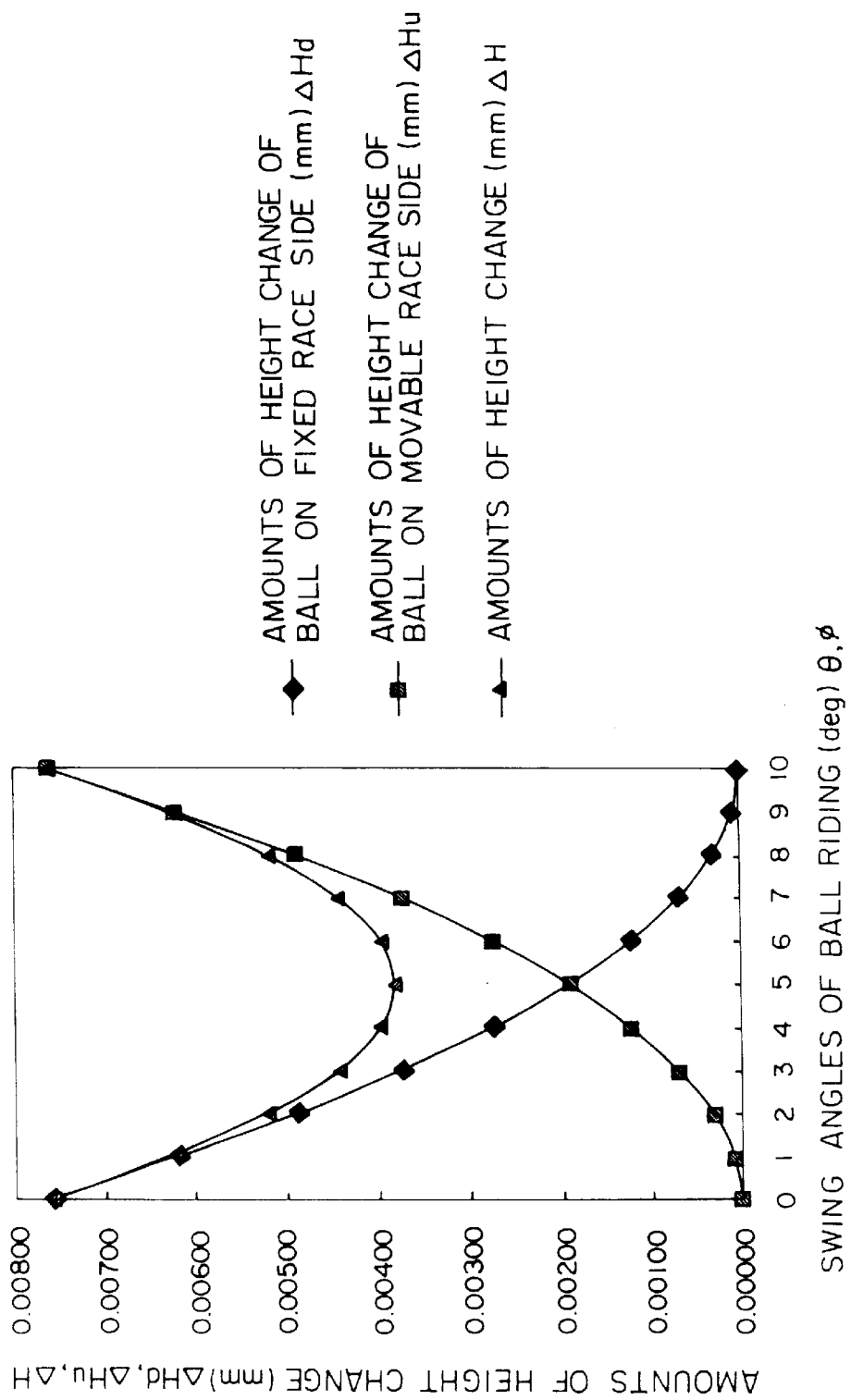
FIG. 10 is a graph showing a relationship between swing angles of ball riding and amounts of height change of the rotation inhibiting mechanism for the movable scroll of the scroll type compressor according to the embodiment of the present invention.

As an example of calculation, assuming that r=4 mm, dw=7 mm, θ=10°, and φ=0 to 10°, the difference ΔH between the state of the condition 1 and the state of the condition 2 is 0.004 to 0.008 mm, which are very small values. In addition, the state of the condition 3 is a middle one between one of the condition 1 and one of the condition 2, thus the conditions 1, 2, and 3 are realized simultaneously. Test results are shown in FIG. 10.

Since Sb=Sa−dw×sin θ, when Sa=5 mm, Sb=3.784 mm.

As will be clear from the above description, the present invention has the following effects.

1. Since the contact points of the ball to the ball rolling grooves of each of the movable and fixed races shift gradually, the durability of the ball improves.

2. Since the sectional configuration of the ball rolling groove of each of the movable and fixed races is made in the form of a simple circular arc or a curved line closely resembling a circular arc, the manufacture of the mechanism is facilitated as compared to the conventional complicated configuration such as an ellipse or a combination of a plurality of curved lines.

What is claimed is:

1. A rotation inhibiting mechanism for a movable scroll of a scroll type fluid machine comprising: a movable race fixed to a movable scroll which revolves with respect to a fixed scroll and provided with a plurality of annular ball rolling grooves extending along a revolutionary locus of said movable scroll; a fixed race opposing said movable race and provided with a plurality of annular ball rolling grooves same as those of said movable race; and a plurality of balls which are held sandwiched between said plurality of annular ball rolling grooves of said movable race and said plurality of annular ball rolling grooves of said fixed race, characterized in that when a diameter of a ball orbit of said movable race is Sa and a diameter of a ball orbit of said fixed race is Sb, a relationship of Sa<Sb is established.

2. A rotation inhibiting mechanism for a movable scroll of a scroll type fluid machine as claimed in claim 1, wherein the sectional configuration of each of said ball rolling grooves is in the form of a circular arc.

3. A rotation inhibiting mechanism for a movable scroll of a scroll type fluid machine as claimed in claim 1, wherein each of said ball rolling grooves is provided with a projection formed at a center of said ball orbit so that each of said balls rolls around said projection.

4. A rotation inhibiting mechanism for a movable scroll of a scroll type fluid machine as claimed in claim 1, wherein said rotation inhibiting mechanism, for said movable scroll comprising said movable race, said plurality of balls and said fixed race has a radius of revolution of (Sa+Sb)/2.

5. A rotation inhibiting mechanism for a movable scroll of a scroll type fluid machine comprising: a movable race fixed to a movable scroll which revolves with respect to a fixed scroll and provided with a plurality of annular ball rolling grooves extending along a revolutionary locus of said movable scroll; a fixed race opposing said movable race and provided with a plurality of annular ball rolling grooves same as those of said movable race; and a plurality of balls which are held sandwiched between said plurality of annular ball rolling grooves of said movable race and said plurality of annular ball rolling grooves of said fixed race, characterized in that when a diameter of a ball orbit of said movable race is Sa and a diameter of a ball orbit of said fixed race is Sb, a relationship of Sa>Sb is established.

6. A rotation inhibiting mechanism for a movable scroll of a scroll type fluid machine as claimed in claim 5, wherein the sectional configuration of each of said ball rolling grooves is in the form of a circular arc.

7. A rotation inhibiting mechanism for a movable scroll of a scroll type fluid machine as claimed in claim 5, wherein each of said ball rolling grooves is provided with a projection formed at a center of said ball orbit so that each of said balls rolls around said projection.

8. A rotation inhibiting mechanism for a movable scroll of a scroll type fluid machine as claimed in claim 5, wherein said rotation inhibiting mechanism, for said movable scroll comprising said movable race, said plurality of balls and said fixed race has a radius of revolution of (Sa+Sb)/2.

* * * * *